US010012978B2

(12) United States Patent
Akazawa et al.

(10) Patent No.: US 10,012,978 B2
(45) Date of Patent: Jul. 3, 2018

(54) METHOD FOR DESIGNING CUTTING CONDITIONS FOR CUTTING

(71) Applicant: Kobe Steel, Ltd., Hyogo (JP)

(72) Inventors: Koichi Akazawa, Hyogo (JP); Shinsuke Asai, Hyogo (JP); Yusuke Sakamoto, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 205 days.

(21) Appl. No.: 15/108,875

(22) PCT Filed: Jan. 8, 2015

(86) PCT No.: PCT/JP2015/050405
§ 371 (c)(1),
(2) Date: Jun. 29, 2016

(87) PCT Pub. No.: WO2015/105159
PCT Pub. Date: Jul. 16, 2015

(65) Prior Publication Data
US 2016/0327940 A1    Nov. 10, 2016

(30) Foreign Application Priority Data
Jan. 8, 2014   (JP) .................................. 2014-001644

(51) Int. Cl.
*G05B 19/416*   (2006.01)
*B23Q 15/18*    (2006.01)
(Continued)

(52) U.S. Cl.
CPC ......... *G05B 19/4163* (2013.01); *B23Q 15/18* (2013.01); *G05B 19/40937* (2013.01);
(Continued)

(58) Field of Classification Search
CPC ...... G05B 19/4163; G05B 2219/36284; G05B 2219/37434; G05B 2219/41109;
(Continued)

(56) References Cited

U.S. PATENT DOCUMENTS 3,579,775 A * 5/1971 Carlson .............. B23Q 17/0985
356/44
3,784,798 A * 1/1974 Beadle ............... G05B 19/4163
700/173

(Continued)

FOREIGN PATENT DOCUMENTS

JP   S63-180408 A    7/1988
JP   2006-102927 A   4/2006
WO   2011/122621 A1  10/2011

OTHER PUBLICATIONS

Takeshi Wago et al.; "Select Way of Milling Cutting Condition for Hardened Steel"; Iwate Industrial Research Institute Study Reports; 1999; vol. 6; Japan; with English language translation.
(Continued)

Primary Examiner — Mark A Connolly
(74) Attorney, Agent, or Firm — Studebaker & Brackett PC

(57) ABSTRACT

A method for designing cutting conditions for cutting a workpiece with a cutting tool uses design parameters, including a feed speed, an axial direction cutting amount, a radial direction cutting amount, and a cutting speed of/by the cutting tool. A deflection amount of the cutting tool is calculated from the design parameters. Then a "chattering vibration" occurs or not in the cutting tool is determined. Depending on the determination result, a maximum cutting thickness of the workpiece is calculated. Then a cutting temperature of the cutting tool is calculated. Then whether a tool life of the cutting tool is satisfied or not is determined. Depending on the determination result, a cutting efficiency
(Continued)

of the cutting tool is calculated and compared with data of a cutting efficiency stored in advance. When the calculated cutting efficiency is a maximum value among the data, the design parameters are used as the cutting conditions.

4 Claims, 3 Drawing Sheets

(51) Int. Cl.
*G05B 19/4093* (2006.01)
*B23C 3/00* (2006.01)

(52) U.S. Cl.
CPC ...... *B23C 3/00* (2013.01); *G05B 2219/36284* (2013.01); *G05B 2219/36289* (2013.01); *G05B 2219/37434* (2013.01); *G05B 2219/41109* (2013.01); *G05B 2219/41256* (2013.01); *G05B 2219/50041* (2013.01); *Y02P 90/265* (2015.11)

(58) Field of Classification Search
CPC ........... G05B 2219/41256; G05B 2219/50041; B23Q 15/18; B23C 3/00
See application file for complete search history.

(56) References Cited

U.S. PATENT DOCUMENTS

| | | | | |
|---|---|---|---|---|
| 5,816,892 | A * | 10/1998 | Lunn | B23C 3/00 |
| | | | | 451/21 |
| 5,917,726 | A * | 6/1999 | Pryor | G05B 19/41875 |
| | | | | 29/712 |
| 9,296,051 | B2 * | 3/2016 | Cigni | B23C 3/18 |
| 2008/0226401 | A1 * | 9/2008 | Hoefler | B23C 5/006 |
| | | | | 407/34 |
| 2013/0046405 | A1 | 2/2013 | Shamoto | |

OTHER PUBLICATIONS

Katsundo Hitomi et al.; "Application of Nonlinear Goal Programming to Multi-goal Optimization of Cutting Conditions"; Japan Society of Mechanical Engineers, Series C; Sep. 1980; vol. 46; No. 409; Japan; with English language translation.

International Search Report; PCT/JP2015/050405 dated Apr. 7, 2015.

Written Opinion of the International Searching Authority; PCT/JP2015/050405 dated Apr. 7, 2015; with English language translation.

* cited by examiner

Experimental Result

Cutting Temperature of S45C Material

METHOD FOR DESIGNING CUTTING CONDITIONS FOR CUTTING

TECHNICAL FIELD

The present invention relates to a method for designing cutting conditions in cutting.

BACKGROUND ART

In the background art, when cutting such as turning or milling is performed on a workpiece such as a steel material by using a cutting tool such as an end mill or a milling cutter, cutting has been performed after "cutting conditions" such as a feed speed of the cutting tool, a cutting amount by the cutting tool, a cutting speed of the cutting tool, the shape of the cutting tool, etc. are made appropriate.

When cutting is performed by using an end mill or a milling cutter, a chattering vibration may occur during the cutting depending on the shape of a cutting tool, or the shape of the cutting tool may be deformed. When such a chattering vibration occurs, there occurs a severe problem as to the machining accuracy or the machined surface property of a workpiece. Therefore, an operator who designs the cutting conditions for the cutting should set the "cutting conditions" to reduce the feed speed of or the cutting amount by the cutting tool to thereby reduce a load in order to prevent the aforementioned problem from occurring.

In addition, as to the tool life of a cutting tool, there arises such a problem that the tool life becomes extremely short when cutting is not performed under appropriate cutting conditions. However, it is difficult to accurately find the cutting conditions with which the tool life can be elongated, and therefore cutting conditions (particularly the cutting speed of the cutting tool) is designed with a margin in many cases.

However, the cutting conditions thus provided with a margin may lead to an excess cost for cutting. For example, there is a problem that a cutting tool may be replaced before reaching its tool life, or cutting time may be increased due to the low-load cutting conditions.

In order to improve such situation, techniques for designing optimum cutting conditions have been developed. The techniques for designing optimum cutting conditions are, for example, ones as disclosed in Non-Patent Literature 1 and Non-Patent Literature 2.

According to Non-Patent Literature 1, in an off-line manner, the shape of a workpiece having been subjected to cutting is measured, and cutting conditions are optimized based on the measured value and an instruction value given in advance for the cutting. Next, in an online manner, a tool life test is performed on a cutting tool, and the tool life and the machining efficiency are converted into losses by a loss function and evaluated on the same dimension. Then, appropriate cutting conditions are designed from the relationship between the tool life and the machining efficiency.

According to Non-Patent Literature 2, a formulation for optimizing cutting conditions in cutting is established by nonlinear goal programming, and appropriate cutting conditions are designed based on the formulation.

CITATION LIST

Patent Literature

Non-Patent Literature 1: Takeshi WAGO, Masaaki WAKATUKI, et al., "Select Way of Milling Cutting Condition for Hardened Steel", Iwate Industrial Research Institute Study Reports, vol. 6 (1999)

Non-Patent Literature 2: Katsundo HITOMI, Nobuto NAKAMURA, et al., "Application of Nonlinear Goal Programming to Multiobjective Optimization of Machining Conditions", Transactions of the Japan Society of Mechanical Engineers, Series C, Vol. 46, No. 409 (September 1980)

SUMMARY OF THE INVENTION

Problem that the Invention is to Solve

When operators engaging in cutting design cutting conditions based on their experience, there occur differences in the cutting conditions due to differences among the operators' experiences in cutting. Thus, it is difficult to design cutting conditions appropriately. In addition, when an inexperienced operator designs cutting conditions, the operator may design cutting conditions with a too large margin, that is, cutting conditions high in manufacturing cost due to his/her lack of experience.

In order to solve the foregoing problem, it is assumed here that appropriate cutting conditions are designed by using Non-Patent Literature 1 and Non-Patent Literature 2.

Non-Patent Literature 1 is a technique for statistically dealing with cutting data of workpieces each having a simple shape so as to optimize cutting conditions and design the cutting conditions. However, the shape of a workpiece to be cut in fact is often a complicated one. It is therefore difficult to apply the technique to an actual cutting step. Even when cutting conditions are designed by using Non-Patent Literature 1, it is obvious that there arises a problem as to the machining accuracy of cutting or the machined surface property of the workpiece.

On the other hand, Non-Patent Literature 2 is a technique for designing appropriate cutting conditions by using quality engineering (nonlinear goal programming). However, it is not realistic because it takes much labor and time to obtain cutting conditions due to a large amount of calculations or a large number of condition items for designing the cutting conditions.

In summary, it is not practical to design appropriate cutting conditions in an actual cutting step by using the techniques of Non-Patent Literature 1 and Non-Patent Literature 2.

The present invention has been developed in consideration of the aforementioned problem. An object thereof is to provide a method for designing cutting conditions in cutting, capable of making prevention of vibration, a tool life and cutting efficiency in cutting compatible with one another, and capable of easily designing cutting conditions.

Means for Solving the Problem

In order to attain the foregoing object, the present invention provides the following technical means.

A method for designing cutting conditions in cutting according to the present invention, which designs cutting conditions required for cutting a workpiece with a cutting tool, uses, as design parameters, a feed speed f of the cutting tool, an axial direction cutting amount da by the cutting tool, a radial direction cutting amount dr by the cutting tool, and a cutting speed v of the cutting tool, and includes: calculating a deflection amount $\alpha$ of the cutting tool by using, of the design parameters, the feed speed f of the cutting tool, the axial direction cutting amount da by the cutting tool and the radial direction cutting amount dr of the cutting tool; determining whether a "chattering vibration" occurs or not in the cutting tool during cutting based on the calculated deflection amount α of the cutting tool and a predetermined threshold β; calculating a maximum cutting thickness $Ct_{max}$ by the cutting tool, which is an allowed cuttable maximum thickness of the workpiece, from the feed speed f of the cutting tool and the radial direction cutting amount dr by the cutting tool, when it is determined that the "chattering vibration" does not occur in the cutting tool; calculating a cutting temperature t of the cutting tool from the calculated maximum cutting thickness $Ct_{max}$, and the cutting speed v of the cutting tool; determining whether a tool life of the cutting tool in cutting is satisfied or not based on the calculated cutting temperature t of the cutting tool and a predetermined threshold γ; calculating a cutting efficiency e of the cutting tool in cutting from a maximum value $v_{max}$ of the cutting speed of the cutting tool allowed in the cutting, the feed speed f of the cutting tool, the axial direction cutting amount da by the cutting tool, and the radial direction cutting amount dr by the cutting tool, when the tool life of the cutting tool is satisfied; and comparing the calculated cutting efficiency e of the cutting tool with data of a cutting efficiency e stored in advance and when the calculated cutting efficiency e of the cutting tool is a maximum value among the data of the cutting efficiency e, using, as the cutting conditions, the feed speed f of the cutting tool, the axial direction cutting amount da by the cutting tool, the radial direction cutting amount dr by the cutting tool, and the cutting speed v of the cutting tool.

Preferably, the design parameters may further include a parameter of a shape of the cutting tool.

Preferably, the deflection amount α of the cutting tool may be calculated by the following expression.

$$\alpha = Fb_{ave}/G$$

α: deflection amount (m)
$Fb_{ave}$: average value (N) of cutting resistance in vibrating direction of cutting tool
G: bending rigidity (N/m) in vibrating direction of cutting tool Preferably, the maximum cutting thickness $Ct_{max}$ by the cutting tool may be calculated by the following expression.

$$Ct_{max} = f \cdot \sin \theta_1$$

$Ct_{max}$: maximum cutting thickness (mm) by cutting tool
f: feed speed (mm/blade) of cutting tool
$\theta_1 = a\cos((r-dr)/r)$
r: radius (mm) of cutting tool
dr: radial direction cutting amount (mm) by cutting tool Advantage of the Invention According to the method for designing cutting conditions in cutting according to the present invention, it is possible to make prevention of vibration, a tool life and cutting efficiency in a cutting tool compatible with one another, and it is also possible to easily design cutting conditions.

MODE FOR CARRYING OUT THE INVENTION

A method for designing cutting conditions in cutting according to the present invention will be described below with reference to the drawings.

Figure 1:
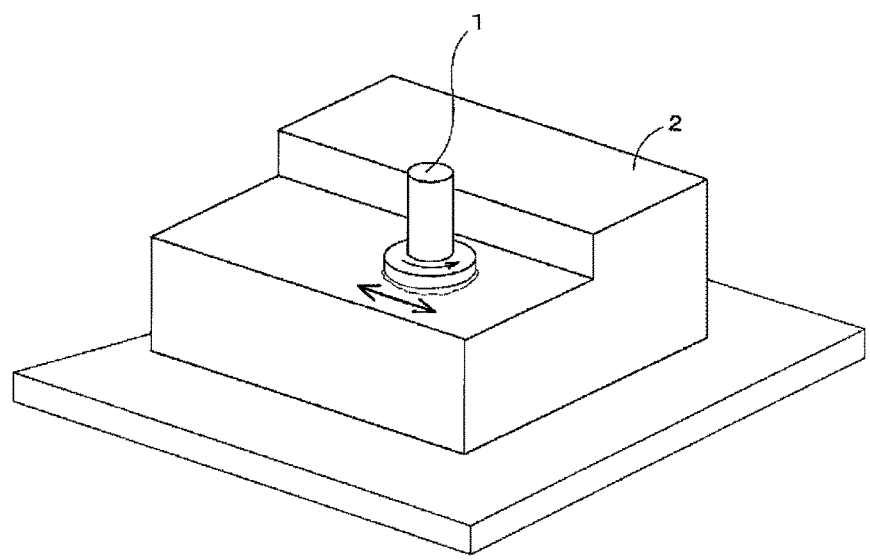
FIG. 1 is a schematic view schematically illustrating cutting.
Figure 2:
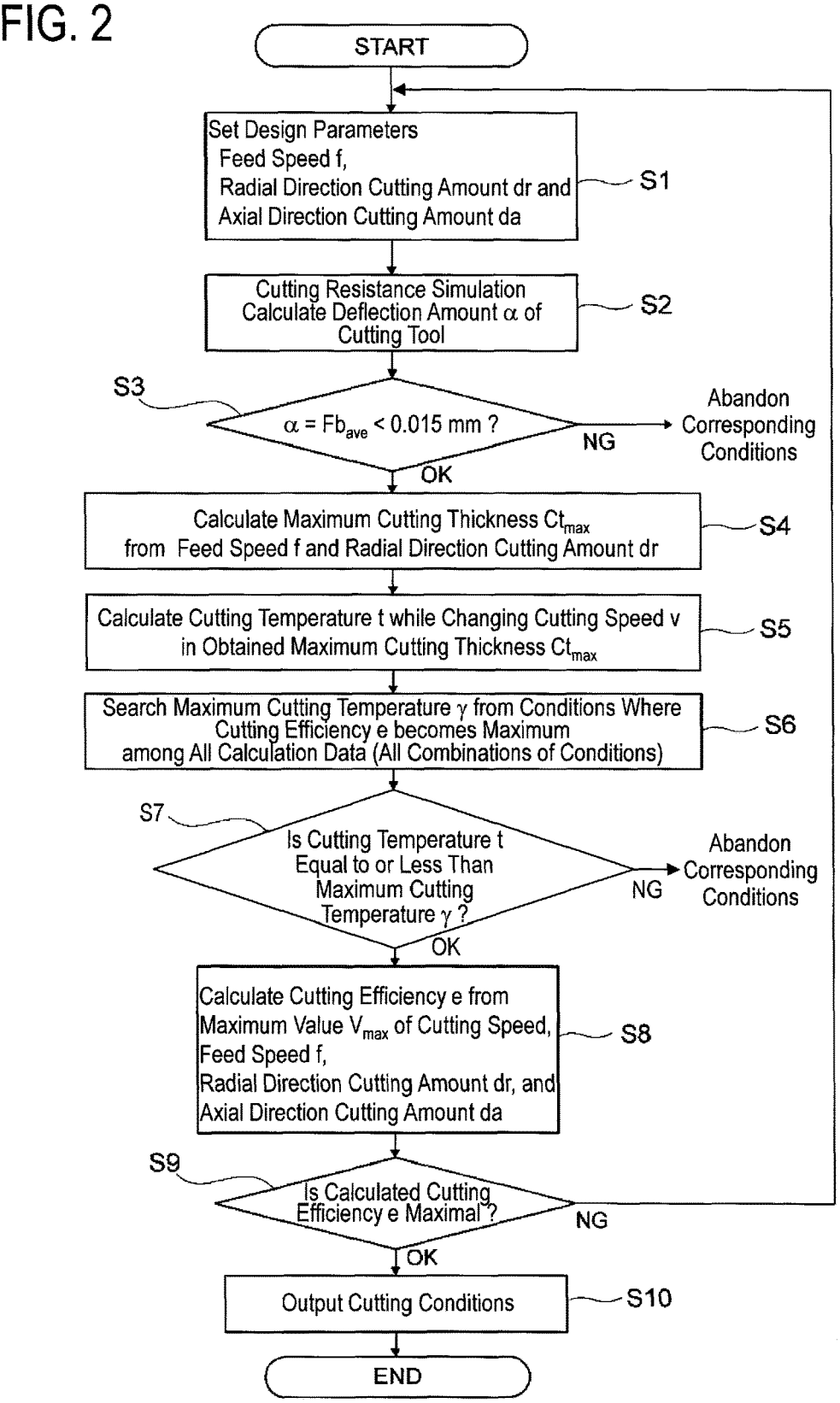
FIG. 2 is a flow chart illustrating a method for designing cutting conditions in cutting according to the present invention.

FIG. 1 is a view schematically illustrating a situation in which cutting is performed on a workpiece 2 by use of a cutting tool 1 under cutting conditions designed by a method for designing cutting conditions according to the present invention. FIG. 2 is a chart illustrating a procedure of the method for designing cutting conditions according to the present invention.

As illustrated in FIG. 1, a step of cutting such as milling is a step in which the workpiece 2 (such as a steel material) fixed to a table of a milling machine is machined into an intended shape or dimensions by use of a cutting tool 1, which rotates, such as an end mill or a milling cutter.

What is required in such a step of cutting is to design suitable cutting conditions (a feed speed v of, and a cutting amount d by the cutting tool 1, etc.). If the cutting conditions are not designed suitably, for example, a "chattering vibration" may occur during the cutting due to deflection of the cutting tool 1, causing a problem as to the machining accuracy of the cutting or the machined surface property of the workpiece 2.

Figure 3:
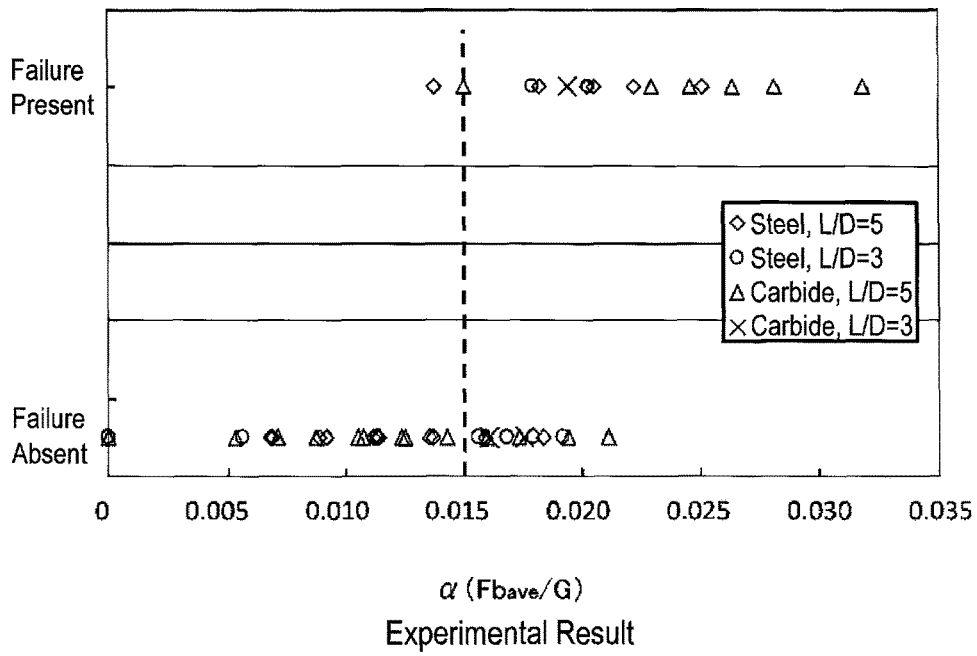
FIG. 3 is a graph showing the relationship between the deflection amount of a cutting tool and presence/absence of a failure.

Therefore, in order to find out a method for designing suitable cutting conditions, the present inventors repeated keen studies, in which cutting was performed under various cutting conditions by using cutting tools 1 having different shapes to survey presence/absence of the chattering vibration during cutting or properties of machined surfaces. An example of experimental conditions provided for the studies is shown in Table 1. Results of experiments under the experimental conditions, that is, the relationship between the deflection amount of the cutting tool 1 and the presence/absence of a failure is shown in FIG. 3.

TABLE 1

| Experimental Conditions | |
|---|---|
| cutting speed v | 100 m/min (1,592 rpm) |
| feed speed f | 0.15 mm/blade (716 mm/min) |
| cutting tool | φ20 end mill (Sumitomo WEX) |
| number of blades | 1 or 3 |
| protrusion amount L/D | three times or five times as long as tool diameter |
| shank material | steel or carbide |

Sumitomo WEX: WaveMill (registered trademark) WEX series made by Sumitomo Electric Industries, Ltd.
L/D: protrusion length L/tool diameter D As a result of the studies, as to cutting resistance acting on the cutting tool 1, it has been discovered that the machined surface property or the machining accuracy in cutting deteriorates when an average cutting resistance $Fb_{ave}$ exceeds a certain upper limit value, $Fb_{ave}$ being an average value of cutting resistance in a vibrating direction of the cutting tool 1 (a radial direction in the case of an end mill tool).

That is, the upper limit value of the average value $Fb_{ave}$ of the cutting resistance varies in accordance with bending rigidity G in the vibrating direction of the cutting tool 1. Therefore, as the bending rigidity G of the cutting tool 1 increases, the upper limit value of the average value $Fb_{ave}$ of the cutting resistance increases. The upper limit value of the average value $Fb_{ave}$ of the cutting resistance is in direct proportion to the bending rigidity G. The relationship between the average value $Fb_{ave}$ of the cutting resistance and the bending rigidity G may be regarded as a ratio, that is, a deflection amount α of the cutting tool 1. In this case, it can be considered that the machined surface property or the machining accuracy in cutting deteriorates when the deflection amount α exceeds a certain upper limit value.

In consideration of the above finding, and with reference to FIG. 3, it can be understood that there occurs a problem in machining quality when the deflection amount α exceeds 0.02 mm. Further, it can be understood that a failure in the machined surface occurs easily when the deflection amount α exceeds 0.015 mm.

That is, the present inventors found that suitable cutting conditions can be designed when the deflection amount α of the cutting tool 1 is made smaller than 0.015 mm (the deflection amount α is controlled).

Based on the above finding, the present inventors arrived at a method for designing cutting conditions.

In the method for designing cutting conditions according to the present embodiment, a deflection amount α of a cutting tool 1 is calculated by using design parameters such as a feed speed f of the cutting tool 1, a cutting amount d by the cutting tool 1, etc., and it is determined whether a "chattering vibration" occurs or not in the cutting tool 1 based on the deflection amount α. In addition, in the designing method, a cutting temperature t of the cutting tool 1 is calculated by using the design parameters, and it is determined whether a tool life is satisfied or not based on the cutting temperature t. Based on the determination result of the tool life and the determination result of the "chattering vibration", most efficient cutting efficiency e is calculated. The design parameters to which the calculation result belongs are designed as cutting conditions.

The design parameters used in the method for designing cutting conditions according to the present embodiment include the feed speed f of the cutting tool 1, an axial direction cutting amount da by the cutting tool 1 and a radial direction cutting amount dr by the cutting tool 1. The design parameters are not limited to those, but a cutting speed v of the cutting tool 1 or a shape of the cutting tool 1 may be used.

FIG. 2 illustrates a flow chart illustrating the method for designing cutting conditions in cutting according to the present invention.

As illustrated in FIG. 2, in the method for designing cutting conditions, it is first determined whether the "chattering vibration" occurs or not in the cutting tool 1. Before the determination of the "chattering vibration", in Step 1 (S1), design parameters including the feed speed f of the cutting tool 1, the axial direction cutting amount da by the cutting tool 1 and the radial direction cutting amount dr by the cutting tool 1 are set.

On this occasion, when one of the feed speed f of the cutting tool 1, the axial direction cutting amount da by the cutting tool 1 and the radial direction cutting amount dr by the cutting tool 1 is decided from other conditions (for example, performance of the cutting tool and the like), it is set as a fixed value. In addition, assume that the other design parameters than the fixed value vary stepwise.

By using the design parameters set thus, the deflection amount α of the cutting tool 1 is calculated by Expression (1) in Step 2.

$$\alpha = Fb_{ave}/G \quad (1)$$

α: deflection amount (m)
$Fb_{ave}$: average value (N) of cutting resistance in vibrating direction of cutting tool
G: bending rigidity (N/m) in vibrating direction of cutting tool Here, a specific method for calculating the deflection amount α in Expression (1) will be described.

To obtain the average value $Fb_{ave}$ of the cutting resistance in Step 2 (S2), a cutting thickness Ct by the cutting tool 1 is first calculated by Expression (2).

$$Ct = f \cdot \sin \theta \quad (2)$$

Ct: cutting thickness (mm) by cutting tool
f: feed speed (mm/blade) of cutting tool
θ: rotation angle of cutting tool Then the calculated cutting thickness Ct is substituted into Expression (3) to calculate a cutting resistance value Fb in a direction in which the cutting tool 1 vibrates. Here, a specific cutting resistance Kr in the vibrating direction (radial direction) of the cutting tool 1 is determined in advance based on the material of the workpiece 2 and the like.

$$Fb = Ct \cdot da \cdot Kr \quad (3)$$

Fb: cutting resistance (N) in vibrating direction of cutting tool
Ct: cutting thickness (mm) by cutting tool
da: axial direction cutting amount (mm) by cutting tool
Kr: specific cutting resistance (N/mm$^2$) in vibrating direction (radial direction) of cutting tool Then the calculated cutting resistance value Fb in the vibrating direction of the cutting tool 1 is substituted into Expression (1) so as to calculate the deflection amount α.

By conducting the aforementioned calculation while changing the feed speed f of the cutting tool 1, the radial direction cutting amount dr by the cutting tool 1 and the axial direction cutting amount da by the cutting tool 1 stepwise, an average cutting resistance $Fb_{ave}$ in the vibrating direction of the cutting tool 1 is obtained. By using the average cutting resistance $Fb_{ave}$, the deflection amount α of the cutting tool 1 is calculated. When the deflection amount α is calculated thus, move to Step 3 (S3).

In Step 3 (S3), based on the calculated deflection amount α of the cutting tool 1 and a predetermined threshold β, it is determined whether a "chattering vibration" occurs or not in the cutting tool 1 during cutting. Here, the predetermined threshold β serving as a reference value for the "chattering vibration" of the cutting tool 1 is set at 0.015 mm (deflection amount) obtained from the result of FIG. 3.

When the calculated deflection amount α is smaller than the predetermined threshold β serving as a reference value (α<β=0.015 mm), it is determined that the "chattering vibration" does not occur in the cutting tool 1. When it is determined that the "chattering vibration" occurs in the cutting tool 1, the set parameters are regarded as incompatible, and abandoned.

When it is determined that the "chattering vibration" does not occur in the cutting tool 1, move to Step 4 (S4).

In Step 4 (S4), a maximum cutting thickness $Ct_{max}$ by the cutting tool 1, which is an allowed cuttable maximum thickness of the workpiece 2, is calculated by Expression (4) based on the feed speed f of the cutting tool 1 and the radial direction cutting amount dr by the cutting tool 1. When the maximum cutting thickness $Ct_{max}$ is calculated thus, move to Step 5 (S5).

$$Ct_{max} = f \cdot \sin \theta_1 \quad (4)$$

$Ct_{max}$: maximum cutting thickness (mm) by cutting tool
f: feed speed (mm/blade) of cutting tool
$\theta_1 = a\cos((r-dr)/r)$ r: radius (mm) of cutting tool dr: radial direction cutting amount (mm) by cutting tool In Step 5 (S5), a cutting temperature t of the cutting tool 1 is calculated from the calculated maximum cutting thickness $Ct_{max}$ by the cutting tool 1, and the cutting speed v of the cutting tool 1. The cutting temperature t of the cutting tool 1 is calculated while changing the cutting speed v of the cutting tool 1 stepwise in the calculated maximum cutting thickness $Ct_{max}$ by the cutting tool 1.

Here, the calculation of the cutting temperature t of the cutting tool 1 characterizing the present invention will be described.

The cutting temperature t of the cutting tool 1 during cutting, that is, the blade edge temperature of the tool gives great influence to the tool life of the cutting tool 1 (the degree of wear of the cutting tool 1). Therefore, a maximum value γ of the cutting temperature of the cutting tool 1, in which a predetermined cutting time can be obtained (the tool life can be satisfied), must be obtained in advance. Cutting conditions are designed by using the obtained maximum value γ of the cutting temperature of the cutting tool 1, and the cutting temperature t of the cutting tool 1 during cutting.

The method for calculating the cutting temperature t of the cutting tool 1 is to calculate from the maximum cutting thickness $Ct_{max}$ by the cutting tool 1 and the cutting speed v of the cutting tool 1 (in case of a milling cutter, the rotational number of the tool). Examples thereof may include a method for actually measuring the cutting temperature t during cutting, and a method for obtaining it by cutting temperature simulation such as a finite element method.

Figure 4:
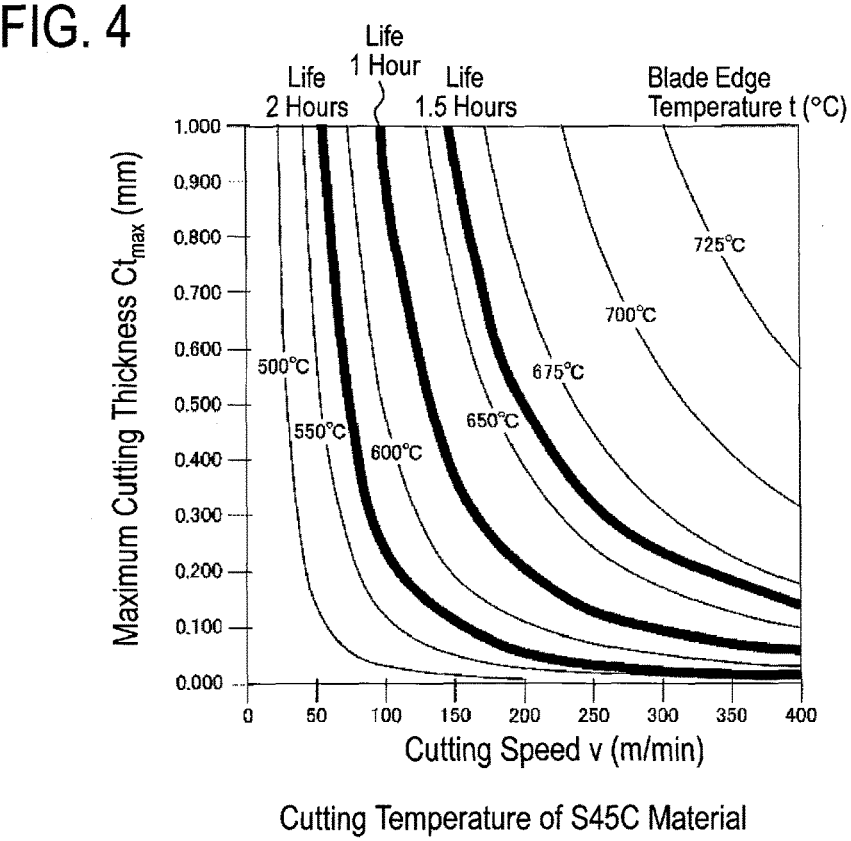
FIG. 4 is a graph showing a change in tool temperature and in tool life in accordance with a change in cutting speed and in maximum cutting thickness.

In the present embodiment, the cutting temperature t of the cutting tool 1 is calculated by using cutting temperature simulation such as a finite element method, based on the maximum cutting thickness $Ct_{max}$ by the cutting tool 1, and the cutting speed v of the cutting tool 1 changed stepwise to correspond to the maximum cutting thickness $Ct_{max}$. FIG. 4 shows a distribution of the calculated cutting temperature t.

As shown in FIG. 4, for example, when the cutting speed v is 200 m/min and the maximum cutting thickness $Ct_{max}$ is 0.2 mm, the cutting temperature t is calculated as 625° C. (to say other words, the tool life is one hour). When the cutting temperature t is calculated thus, move to Step 6 (S6).

In Step 6 (S6), among all calculation data (all combinations of conditions) of the cutting temperature t of the cutting tool 1, a maximum value γ of the cutting temperature of the cutting tool 1 is searched from the conditions in which a cutting efficiency e becomes the maximum. Then, move to the next Step 6 (S6).

In Step 7 (S7), it is determined whether the cutting temperature t of the cutting tool 1 calculated based on FIG. 4 is at most the predetermined threshold γ (the maximum value of the cutting temperature of the cutting tool 1) or not; to say other words, whether the tool life of the cutting tool 1 during cutting is satisfied or not.

Incidentally, when the calculated cutting temperature t of the cutting tool 1 is higher than the maximum value γ of the cutting temperature of the cutting tool 1, that is, when the tool life of the cutting tool 1 is not satisfied, the set parameters are regarded as incompatible, and abandoned.

When the calculated cutting temperature t of the cutting tool 1 is equal to or less than the maximum value γ of the cutting temperature of the cutting tool 1, that is, when the tool life of the cutting tool 1 is satisfied, move to Step 8 (S8).

In Step 8 (S8), cutting efficiency e of the cutting tool 1 in cutting is calculated from a maximum value $v_{max}$ of the cutting speed of the cutting tool 1 allowed in cutting, the feed speed f of the cutting tool 1, the axial direction cutting amount da by the cutting tool 1, and the radial direction cutting amount dr by the cutting tool 1. When the cutting efficiency e is calculated thus, move to Step 9 (S9).

In Step 9 (S9), the calculated cutting efficiency e of the cutting tool 1 is compared with data of cutting efficiency e stored in advance. When the calculated cutting efficiency e of the cutting tool 1 is a maximum value among the data of the cutting efficiency e, the feed speed f of the cutting tool 1, the axial direction cutting amount da by the cutting tool 1 and the radial direction cutting amount dr by the cutting tool 1 are used as the cutting conditions.

Thus, a combination of design parameters (the feed speed f, the radial direction cutting amount dr and the axial direction cutting amount da) satisfying the machining quality of the workpiece 2 and the tool life of the cutting tool 1 can be obtained. Then, calculation is repeated while changing the feed speed f, the radial direction cutting amount dr and the axial direction cutting amount da bit by bit, so as to obtain all the combinations of design parameters satisfying the machining quality of the workpiece 2 and the tool life of the cutting tool 1. Of all the obtained combinations of design parameters, the conditions in which the cutting efficiency e is the highest are outputted as suitable cutting conditions in Step 10 (S10).

On the other hand, as a result of comparison between the cutting efficiency e of the cutting tool 1 and the data of the cutting efficiency e stored in advance, when the cutting efficiency e of the cutting tool 1 is not the maximum value among the data of the cutting efficiency e (the cutting efficiency e is not good), return to setting of design parameters (the initial stage of Step 1), in which the cutting conditions are designed again.

In summary, the method for designing cutting conditions in cutting according to the present invention is to calculate a deflection amount α of the cutting tool 1 so as to prevent a "chattering vibration" from occurring, to calculate a cutting temperature t of the cutting tool 1 so as to obtain a desired tool life, to calculate cutting efficiency e of the cutting tool 1 so as to maximize the machining efficiency, to design, from the calculated result, design parameters, and to output the design parameters as suitable cutting conditions; that is, to optimize the cutting conditions.

EXPERIMENTAL EXAMPLE

Next, description will be made about an experimental result in which cutting conditions for cutting were designed by using the method for designing cutting conditions in cutting according to the present invention.

As the cutting tool 1 for use in this experiment, an end mill tool having a tool diameter of 30 mm, a nose radius of 0.8 mm, the number of blades of four, and a protrusion length of 150 mm was prepared. As the workpiece 2, S45C carbon steel (carbon steel for machine and structural use: JIS G 4051 (1979)) was prepared. An experiment for designing cutting conditions and optimizing the cutting conditions for performing cutting on the S45C carbon steel as the workpiece 2 was performed by using the aforementioned end mill tool 1.

As a result of application of the method for designing cutting conditions, the feed speed f of the end mill tool 1 was calculated as 197 mm/min, the radial direction cutting amount dr was calculated as 7.5 mm, the axial direction cutting amount da was calculated as 102 mm, the rotational number of the tool was calculated as 4,918 rpm, and a torsion angle was calculated as 60 degrees.

Based on the calculated cutting conditions, the end mill tool 1 was made up, and an experiment of cutting was performed by using the end mill tool 1. As a result of the cutting, the machined surface property and the machining accuracy in the workpiece 2 were good. In addition, it was proved that in actual cutting, the optimized cutting conditions satisfied the tool life of one hour (time allowed for the cutting) shown in data of the upper limit value of the cutting temperature t of the end mill tool 1 (refer to FIG. 4).

As the aforementioned experimental result, when the method for designing cutting conditions in cutting according to the present invention is used, it is possible to suppress a "chattering vibration" in the cutting tool 1 and it is also possible to use the cutting tool 1 until immediately before reaching its tool life. Further, it is possible to design suitable cutting conditions in which the cutting efficiency is the most efficient.

The embodiment disclosed herein should be regarded not as restrictive but as exemplary in all respects.

For example, the method for designing cutting conditions in cutting according to the present invention has been described by using a method of cutting such as milling in which a cutting with a rotary cutting tool 1 is performed on a fixed workpiece 2. However, it may be applied to a method of cutting such as turning in which a cutting with a fixed cutting tool 1 is performed on a rotary workpiece 2.

Particularly in the embodiment disclosed herein, matters not disclosed clearly, such as driving conditions or operating conditions, various kinds of parameters, dimensions, weights and volumes of components, etc. do not depart from the scope that is regularly carried out by a person skilled in the art. Values that can be estimated easily by a regular person skilled in the art are used therefore.

The present application is based on a Japanese patent application (Patent Application No. 2014-1644) filed on Jan. 8, 2014, the contents of which are incorporated herein by reference.

DESCRIPTION OF REFERENCE NUMERALS AND SIGNS

1 Cutting tool
2 Workpiece

The invention claimed is:

1. A method for designing cutting conditions that designs cutting conditions required for cutting a workpiece with a cutting tool, comprising:
calculating a deflection amount of the cutting tool by using design parameters comprising a feed speed of the cutting tool, an axial direction cutting amount by the cutting tool, a radial direction cutting amount by the cutting tool, and a cutting speed of the cutting tool;
determining whether a "chattering vibration" occurs or not in the cutting tool during the cutting based on the calculated deflection amount of the cutting tool and a predetermined threshold;
calculating a maximum cutting thickness by the cutting tool, which is an allowed cuttable maximum thickness of the workpiece, from the feed speed of the cutting tool and the radial direction cutting amount by the cutting tool, when it is determined that the "chattering vibration" does not occur in the cutting tool;
calculating a cutting temperature of the cutting tool from the calculated maximum cutting thickness, and the cutting speed of the cutting tool;
determining whether a tool life of the cutting tool in the cutting is satisfied or not based on the calculated cutting temperature of the cutting tool and a predetermined threshold;
calculating a cutting efficiency of the cutting tool in the cutting from a maximum value of the cutting speed of the cutting tool allowed in the cutting, the feed speed of the cutting tool, the axial direction cutting amount by the cutting tool, and the radial direction cutting amount by the cutting tool, when the tool life of the cutting tool is satisfied; and
comparing the calculated cutting efficiency of the cutting tool with data of a cutting efficiency stored in advance and when the calculated cutting efficiency of the cutting tool is a maximum value among the data of the cutting efficiency, using, as the cutting conditions, the feed speed of the cutting tool, the axial direction cutting amount by the cutting tool, the radial direction cutting amount by the cutting tool, and the cutting speed of the cutting tool.

2. The method for designing cutting conditions in a cutting according to claim 1, wherein the design parameters further comprise a parameter of a shape of the cutting tool.

3. The method for designing cutting conditions in a cutting according to claim 1, wherein the deflection amount of the cutting tool is calculated by the following expression:

$$\alpha = Fb_{ave}/G,$$

wherein $\alpha$ is the deflection amount (m),
$Fb_{ave}$ is an average value (N) of a cutting resistance in a vibrating direction of the cutting tool and
G is a bending rigidity (N/m) in the vibrating direction of the cutting tool.

4. The method for designing cutting conditions in a cutting according to claim 1, wherein the maximum cutting thickness by the cutting tool is calculated by the following expression:

$$Ct_{max} = f \cdot \sin \theta_1,$$

wherein $Ct_{max}$ is the maximum cutting thickness (mm) by the cutting tool,
f is the feed speed (mm/blade) of the cutting tool,
$\theta_1 = a \cos((r-dr)/r)$,
r is a radius (mm) of the cutting tool, and
dr is the radial direction cutting amount (mm) by the cutting tool.

* * * * *